(12) United States Patent
Buck, Jr.

(10) Patent No.: US 12,255,989 B1
(45) Date of Patent: Mar. 18, 2025

(54) ENHANCED BANDWIDTH FOR SECURE OPTICAL COMMUNICATIONS

(71) Applicant: Lockheed Martin Corporation, Bethesda, MD (US)

(72) Inventor: Joseph Robert Buck, Jr., Superior, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 367 days.

(21) Appl. No.: 17/740,623

(22) Filed: May 10, 2022

(51) Int. Cl.
*H04L 9/08* (2006.01)
*H04B 10/70* (2013.01)

(52) U.S. Cl.
CPC .......... *H04L 9/0852* (2013.01); *H04B 10/70* (2013.01)

(58) Field of Classification Search
CPC .............................. H04L 9/0852; H04B 10/70
See application file for complete search history.

(56) References Cited

U.S. PATENT DOCUMENTS

| | | | | |
|---|---|---|---|---|
| 10,158,481 B2 * | 12/2018 | Bunandar | ............. | H04L 9/0852 |
| 2005/0135620 A1 * | 6/2005 | Kastella | .................... | H04L 9/12 |
| | | | | 380/256 |
| 2013/0016835 A1 * | 1/2013 | Zbinden | ................ | H04B 10/70 |
| | | | | 380/255 |
| 2020/0052891 A1 * | 2/2020 | Krenn | ................... | H04L 9/0819 |

* cited by examiner

*Primary Examiner* — Bryan Y Lee

(57) ABSTRACT

Provided herein are various techniques and equipment for establishing secure non-classical communications between distant nodes. In one example, a method includes introducing, by at least one photon source, source photons into corresponding waveguides configured to convert the source photons into randomly timed pairs of resultant non-classical photons having corresponding polarization states. The method also includes providing first photons of each of the pairs for measurement of the corresponding polarization states and timing, and providing second photons of each of the pairs for combination into a beam for transfer to a distant node and establishment of a cryptographic key, where the second photons from one of the waveguides is presented in an orthogonal polarization before combination.

20 Claims, 8 Drawing Sheets

ENHANCED BANDWIDTH FOR SECURE OPTICAL COMMUNICATIONS

TECHNICAL BACKGROUND

Efficient, non-classical sources of photons are an important tool in applying quantum techniques to communication and remote sensing. One way in which classical optical sources differ from non-classical sources is in photon statistical distributions. For example, classical optical sources produce Poisson distributions, while non-classical optical sources can produce deterministic distributions. While classical optical sources can be used to perform secure communication, there is a significant inefficiency imposed on the communication channel capacity due to the need to minimize the probability of multiple photons within a single pulse, typically by using very low intensity sources. Non-classical optical sources can provide a deterministic quantity of photons with high fidelity in the photon number state. While there are many physical systems that can provide this non-classical capability, these are not suitable for compact integration in a secure communication system. Example non-classical physical systems include photon turnstiles, cavity-QED (quantum electrodynamics), ions, 3D lattices, atomic vapor cells, and quantum dots. Moreover, many of the non-classical architectures employed for secure communications that are built upon these existing solutions require fast-switching polarization control for photons. This can ultimately restrict the bandwidth of communications to the speed of the polarization control elements, such as liquid crystal (LCD) polarizers.

OVERVIEW

Discussed herein are various enhanced architectures and techniques for providing non-classical communications between communication nodes. These non-classical communications, sometimes referred to as quantum communications, can establish shared cryptographic keys for encrypting data. First, a handshaking process occurs to establish a shared cryptographic key, then this key is used to encrypt transferred data. The keys can be securely and continuously generated to encrypt data over time. The architectures herein employ the use of optical sources that couple to waveguides which produce pairs of photons as non-classical, single photon states, with one of the photons of the pairs detected/measured locally and the other transferred to a distant node. Timeframes to generate the photon pairs in the waveguides can produce randomly timed photons having corresponding polarization states which are used to form a beam transmitted to a remote node. Basis states for the beam can be switched at a rate slower than the photon production rate, and provide error and eavesdropping checks while maintaining a high bandwidth.

In one example, a method includes introducing, by at least one photon source, source photons into corresponding waveguides configured to convert the source photons into randomly timed pairs of resultant photons having corresponding polarization states. The method also includes providing first photons of each of the pairs for measurement of the corresponding polarization states and timing, and providing second photons of each of the pairs for combination into a beam for transfer to a distant node and establishment of a cryptographic key, where the second photons from one of the waveguides is presented in an orthogonal polarization before combination.

In another example, an apparatus includes at least one photon source configured to introduce source photons into corresponding waveguides configured to convert the source photons into randomly timed pairs of resultant photons having corresponding polarization states. The waveguides are configured to provide first photons of each of the pairs to detectors that measure the corresponding polarization states and timing, and provide second photons of each of the pairs for delivery to a beam combiner. The beam combiner is configured to establish a combination of the second photons into a beam for transfer to a distant node and establishment of a cryptographic key, where the second photons for one of the waveguides is presented in an orthogonal polarization before combination.

In yet another example, a system includes a sender node and a receiver node. The sender node configured to generate an optical beam by combination of randomly timed streams of single photon states and transfer the optical beam for delivery to a receiver node, where a basis of the optical beam is specified on a shared time binning. The receiver node is configured to generate a record by at least detecting the single photon states and a measurement basis used for the detected photon states, and transfer the record for delivery to the sender node. The sender node is configured to process the record against at least local measurements of polarization and timing of the single photon states to determine a checksum indicating which portions of the record are correct, and transfer the checksum for delivery to a receiver node. The receiver node configured to process the checksum and the record to determine a secure shared key, where communications are exchanged between the sender node and the receiver node based on the secure shared key.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
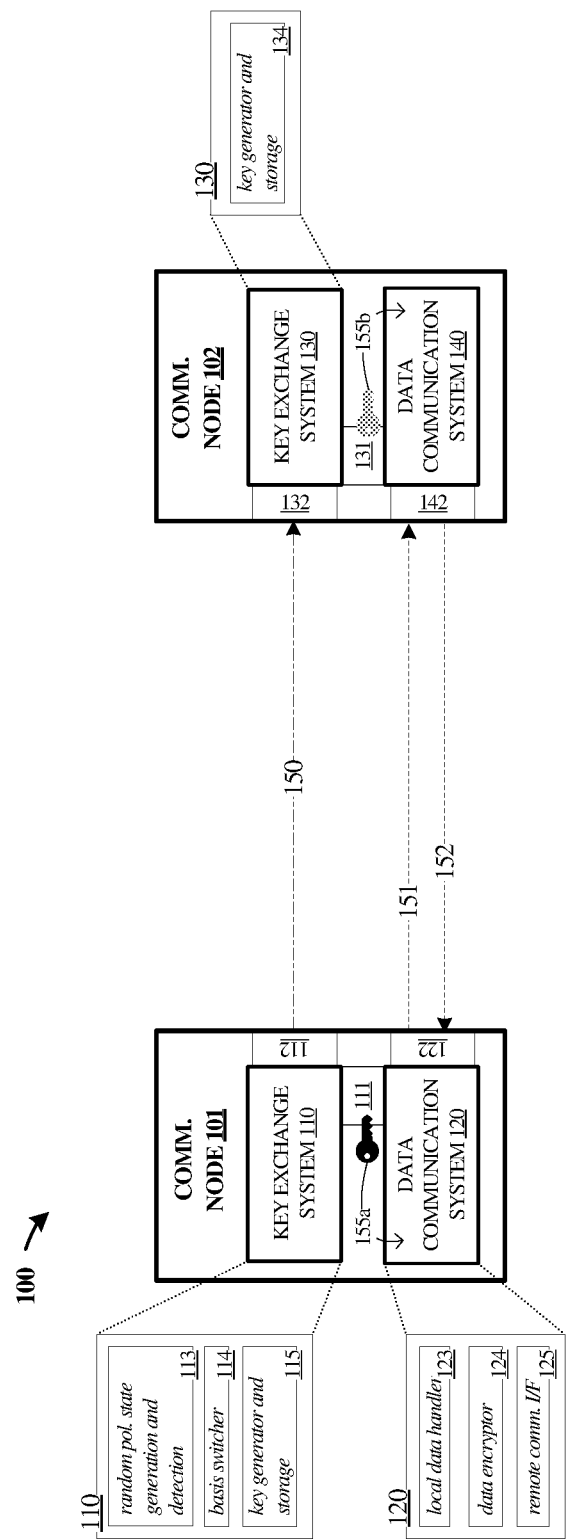
FIG. 1 illustrates a communication system in an implementation.

Non-classical communications, often encompassing the term quantum communications, can establish and distribute cryptographic keys that are employed to encrypt, or otherwise secure, data exchanged between endpoints. A handshaking process occurs to establish a shared cryptographic key, then this shared secure key is used to encrypt data. Many quantum key distribution protocols have been developed, such as BB84, SARG04, and E91. The examples herein can be applied to such protocols, or instead can employ different enhanced techniques and protocols discussed below. Advantageously, the examples herein greatly reduce reliance on the bottlenecks of polarization control and switching found in many quantum shared secure key schemes.

In one example, single photons having polarization states are generated by a photon source, such as a deterministic single photon source. These single photons are transformed into pairs of non-classical single photon states within a waveguide material configured to perform a photon down-conversion process. This down-conversion can include spontaneous parametric down-conversion (SPDC) which produces entangled photon pairs having combined energies and momenta based on the energy and momentum of the original photon in the system of the crystal lattice of the waveguide. The production of photon pairs occurs with non-deterministic timing. A second pair of photons can be established in a similar manner in another waveguide. Random timing is established between the two pairs when combined in a mutually-orthogonal manner. This random timing can be exploited to transfer random sequences of polarization states in an optical beam from a sender node to a remote node. A handshaking operation between the sender node and receiver node can then be established using these polarization states, along with time-binned basis control, to establish a secure shared cryptographic key. Basis for the beam can be switched at a rate slower than the photon production rate, and provide error and eavesdropping checks while maintaining a high bandwidth of communications.

While the examples herein may employ additional detector elements at the sender node to locally determine polarization states and timing of the photons, an overall higher communication channel system efficiency can be achieved. For instance, traditional systems employ active switching of polarization states and basis at a rate commensurate with the photon rate. This requires use of fast-switching polarization modulation elements, such as liquid crystal (LCD) polarizers, which have limitations on switching speed for polarization and basis and thus also limit maximum communication channel rates. Also, traditional systems employ fast basis switching, typically at a 50% duty cycle of photon rates, which significantly impacts communication channel overhead for eavesdropper and calibration checks.

Inline fast switching of polarization at the photon rate is not required in the included examples to produce a high photon rate and corresponding polarization states. Instead, the examples discussed herein use photon sources to produce individual photon streams at frequencies of 100 MHz and above. When two mutually-orthogonal photon streams are combined into a beam for transfer to a remote node, a doubling of the photon rate is achieved. The photon rate for each photon stream can thus be set to half of that of the detector saturation rates, which can also scale according to time-multiplexed usage of arrays of detectors. Much higher data rates, such as 10 GHz or more, can be achieved when combined with binned basis switching that spans many individual photons and wavelength division multiplexing (WDM) of many sets of photon wavelengths and associated waveguide structures. Reliability can also be increased beyond systems that require fast-switching polarization modulation control elements, as passive elements are employed to produce the randomized polarization of photons.

Turning now to a first example implementation, FIG. 1 is provided. FIG. 1 includes system 100 which illustrates an architecture for distributing a secure shared key between two nodes or endpoints. Specifically, system 100 includes communication node 101 and communication node 102. In this example, communication node 101 can be referred to as a sender node and communication node 102 can be referred to as a receiver node, although the associated roles can be reversed depending on the particular operation of the nodes and bi-directional nature of communications. Thus, communication node 101 and communication node 102 can include the same or similar elements. For purposes of discussion of FIG. 1, communication node 101 and communication node 102 highlight different elements used in each node.

Communication node 101 and communication node 102 can communicate over different communication links, such as links 150-152 shown in FIG. 1. Although different quantities and different types of links might be employed, link 150 typically comprises an optical link and links 151-152 can comprise optical or radio-frequency links. Link 150 can be employed for establishment of secure shared keys, while links 151-152 can be employed for unsecure communications during a key exchange process, as well as secure communications for data encrypted or encoded using the secure shared keys (once established). Concurrent communications and signaling can be carried by any of links 150-152, such as when new secure shared keys are established over link 150 during transfer of communications over links 151-152 as secured by already-established shared keys.

Communication node 101 includes key exchange system 110 and data communication system 120. Physical layer communication elements for key exchange system 110 are included in element 112, and physical layer communication elements for communication system 120 are included in element 122. Communication node 102 includes key exchange system 130 and data communication 140. Physical layer communication elements for key exchange system 130 are included in element 132, and physical layer communication elements for communication system 140 are included in element 142. Key storage element 111 is included in communication node 101. Key storage element 131 is included in communication node 102.

In transmit operations, random polarization state generation and detection element 113 generates a randomly-timed sequence of individual photons having corresponding polarization states. This sequence of photons is formed from two streams of non-classical and mutually-orthogonal photon states which are originally sourced by one or more classical or non-classical photon sources. Each of the resulting photon streams are non-classical distributions of light with high probability of single photon states at a high average rate and a known temporal distribution. More specifically, waveguide structures within element 113 receive individual source photons produced by the sources and downconvert those source photons into pairs of resultant photons at double the wavelength (half the frequency). The resultant non-classical photons will have polarization states associated therewith, but are as-yet unobserved in communication node 101. Thus, first resultant photons of each of the pairs are routed to detectors of element 113 for determination of timing and polarization states of the resultant photons. Second resultant photons of each of the pairs, each forming a photon stream, are routed to a photon combination element that combines the second resultant photons of each of the pairs into a single combined stream or beam. However, one of the photon streams is passed through a polarization element to transform a corresponding polarization into an orthogonal polarization before combination into the single beam. This beam then has a basis property applied thereto by basis switcher 114 before being transferred through optic elements of physical layer communication elements 112 for delivery to communication node 102.

The polarization of the two streams of mutually-orthogonal photons can be in a first polarization basis, such as linear or rectilinear (often referred to as horizontal/vertical or up/down) and then occasionally transformed into a second polarization basis by basis switcher 114, such as circular (often referred to right/left). Other basis configurations can be employed, such as elliptical, or the opposite of the configurations noted above. This basis switching can be used to check for observations made to the beam while in transit, whether from intentional eavesdropping or passive observation by natural processes, each leading to a perceived increase in error rate for that particular basis. However, the examples herein provide for a much lower rate of basis switching than that of the photons themselves, such as 1% of the photon rate.

In one example, basis switcher 114 can adjust basis switching rate based on error rate observed for at least the non-classical channel. Faster basis switching will reduce channel efficiency, but increase overall channel integrity. The rate of basis change is typically far less than that of the photon rate. This leads to a higher communication channel efficiency of the beam than other basis switching techniques, even with an alterable basis change rate. The rate of the basis changing can also be selectable to modify beam properties for a particular error rate or eavesdropping rate and maintenance of a desired bandwidth. For example, if the quantity of photon states successfully identified by a remote node drops below a target quantity or rate, then the basis switching rate can be increased to consequently decrease an efficiency of the beam in exchange for higher photon detection integrity or detection energy. Likewise, if the quantity of photon states successfully identified by the remote node rises above a target quantity or rate, then the basis switching rate might be decreased to consequently increase an efficiency of the beam in exchange for lower photon detection integrity or detection energy. Basis switcher 114 can receive indications of the error rate based on the checksums determined by element 113.

Communication node 102 receives the optical beam represented by link 150. Optic elements of physical layer communication elements 112 can condition and transfer the beam to optical systems or electro-optical systems which take measurements of the beam and the carried polarization states. Key generator and storage element 115 of communication node 101 generates a record by at least detecting the single photon states of the optical beam under a selected measurement basis, which can be selected at random. The record is then transferred for delivery to communication node 101, which may occur over unsecured and 'classical' optical links or RF links, such as over link 152. Key generator and storage element 115 processes the record against at least local measurements of polarization and timing of the single photon states made during transfer of the optical beam, and determines a checksum indicating which portions of the record are correct. Communication node 101 transfers the checksum for delivery to the receiver node (which may occur over unsecured and 'classical' optical links or RF links), such as over link 151. Key generator and storage element 133 of communication node 102 processes the checksum and the record to determine secure shared key noted by key 155*b*. In parallel, key generator and storage element 116 of communication node 101 also determines this same secure shared key, noted by key 155*a*. Communications are exchanged between communication node 101 and communication node 102 based on the secure shared key (155*a*, 155*b*), which can be stored in a buffer of key storage elements 111 and 131. Typically, the key will be used for a particular set of data and then discarded, and another key exchange operation occurs to establish another secure shared key for another set of data. In this manner, secure communications can be established between communication node 101 and communication node 102.

A further discussion of the operations of FIG. 1 are included below. However, included first is a more detailed discussion of the various elements of FIG. 1. Communication nodes 101 and 102 can include similar elements as each other to provide for symmetric and bi-directional communication, but some examples may include unidirectional or asymmetric communication and the included elements can vary based on such applications. Typically, communication nodes 101 and 102 each comprise data communication nodes which exchange data communications over wireless links, which might include optical or RF-based links, although wired links are not precluded.

Key exchange system 110 and 130 each include various non-classical and classical elements, such as noted for random polarization state generation and detection element 113, which are configured to generate single photons having polarization properties, propagate those single photons through waveguides that generate photon pairs, and provide the photon pairs for both detection/measurement and transfer to a remote node. Key exchange system 110 and 130 includes laser sources, waveguides, passive polarizers, selectable polarizers, optical beam splitters, optical beam combiners, and single photon detectors. The single photon detectors can include Geiger mode detectors, arrays of Geiger mode detectors, or other detector technologies including photodiodes, avalanche photodiodes (APDs), photomultiplier elements, along with various optics or mirrors to direct photons onto the associated sensing elements, or other similar equipment. Optical multiplexing equipment can be included to fan-out or distribute single photons in time across many detector elements to account for recovery times of the detector elements. When multiple wavelengths of photons are employed, key exchange system 110 and 130 can include wavelength division multiplexing elements, such as beam combiners that operate over multiple wavelengths, and further detector elements suitable to the quantity of wavelengths. Elements of physical layer communication elements 112 and 132 can be included within key exchange system 110 and 130, and can include various optics, focusing elements, mirrors, deformable optical elements, micro-electromechanical elements, aiming/pointing systems, and similar elements.

Key exchange systems 110 and 130 also include various control system or computing systems configured to control and monitor operation of the included elements 113-115 and 134. Various computing systems, control circuitry, microprocessors, distributed computing systems, central processing units (CPUs), graphics processing units (GPUs), or other specialized, programmable, or discrete processing and logic elements. Peripheral devices can be included to support operation of the processing or control elements, such as memory devices, data storage devices of various media, digital data interfaces, and network communication elements can be included. For example, basis switcher 114 can be a control system configured to provide a binary control signal to a basis switching element, such as a selectable polarizer, on a time-binning basis. Key generator and storage element 115 can comprise various processing systems configured to process data indicating measured photon states, basis, measurement indications received from a remote node, and other information to produce a checksum and secure shared key. Key generator and storage element 115 also interfaces with key storage element 111 which can hold a secure shared key for a period of time. Key storage elements 111 and 134 include data storage elements, such as buffers, caches, memory devices, or storage drives.

Data communication systems 120 and 140 include various classical communication equipment configured to communicate over one or more communication links, such as shown for links 151-152. These links can include RF or optical links, and data communication systems 120 and 140 include equipment and circuitry suitable to support data communications over such links and media. Example RF communication equipment includes transmitters/receivers, transceivers, antennas, amplifiers, filters, feeds, interconnect elements, antenna pointing/aiming equipment, and other similar equipment. Example optical communication equipment includes optical sources, optical receivers/detectors, optical fibers, optical waveguides, modulators, optics, beam pointing/aiming equipment, and other similar equipment. Elements of physical layer communication elements 122 and 142 can be included within data communication systems 120 and 140, and vary according to the physical media employed to form communication links.

Data communication system 120 also includes local data handler 123, data encryptor 124, and remote communication interface 125. Data communication system 140 can include similar elements as data communication system 120, although variations are possible. Local data handler 123 receives data for transmission from one or more data or network systems over a corresponding data interface or packet interface, or can obtain data locally stored in a communication node. This data can then be encrypted or secured by data encryptor 124 using shared security keys, as determined herein and stored in element 111 or 131, before transfer to another communication node. Data encryptor 124 can thus comprise various encryption algorithms, hardware, software, programs, processing elements, memory devices, and other equipment which can encode or encrypt data using one or more security keys. Remote communication interface 125 interfaces the data communication system with any physical layer elements represented by element 122 for transfer, exchange, transmission, or receipt of data (encrypted or otherwise).

Optical link 150 comprises an optical link established over free space or over optical waveguides/fiber, although other suitable physical media can be employed. Optical link 150 includes specialized communication protocols and media noted herein for carrying sequences of single photons each having polarization properties. Optical link 150 might include more than one concurrent channel, portion, and wavelength.

Links 151-152 can each use various communication media, such as air, space, metal, optical fiber, or some other signal propagation path, including combinations thereof. Links 151-152 can include any number of discrete channels or aggregated channel configurations, and can each be a direct link or might include various equipment, intermediate components, systems, and networks. Links 151-152 might comprise radio frequency (RF) modulated communications, or may comprise optical links carrying modulated optical communications. Links 151-152 carry signaling that has a particular set of signal parameters that may include center frequency, carrier frequencies, bandwidth, power settings, channels, channel sets, frequency sets, or frequency spread, among others. While implementations of links 151-152 are not limited to a particular frequency range, some implementations may utilize a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations. When optical communications are employed, these communications typically include optically-relevant carrier frequencies and modulations according to various optical communication standards.

While not required, links 151-152 can employ various network communication protocols and signaling arrangements, such as that specified for transmission control protocol/Internet protocol (TCP/IP), Ethernet, IEEE 802.11xx (Wi-Fi), Long Term Evolution (LTE), LTE Advanced, 5G NR (5G New Radio), 4G, 5G, Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), or some other wireless communication format, including combinations, evolutions, improvements, or variations thereof.

Figure 2:
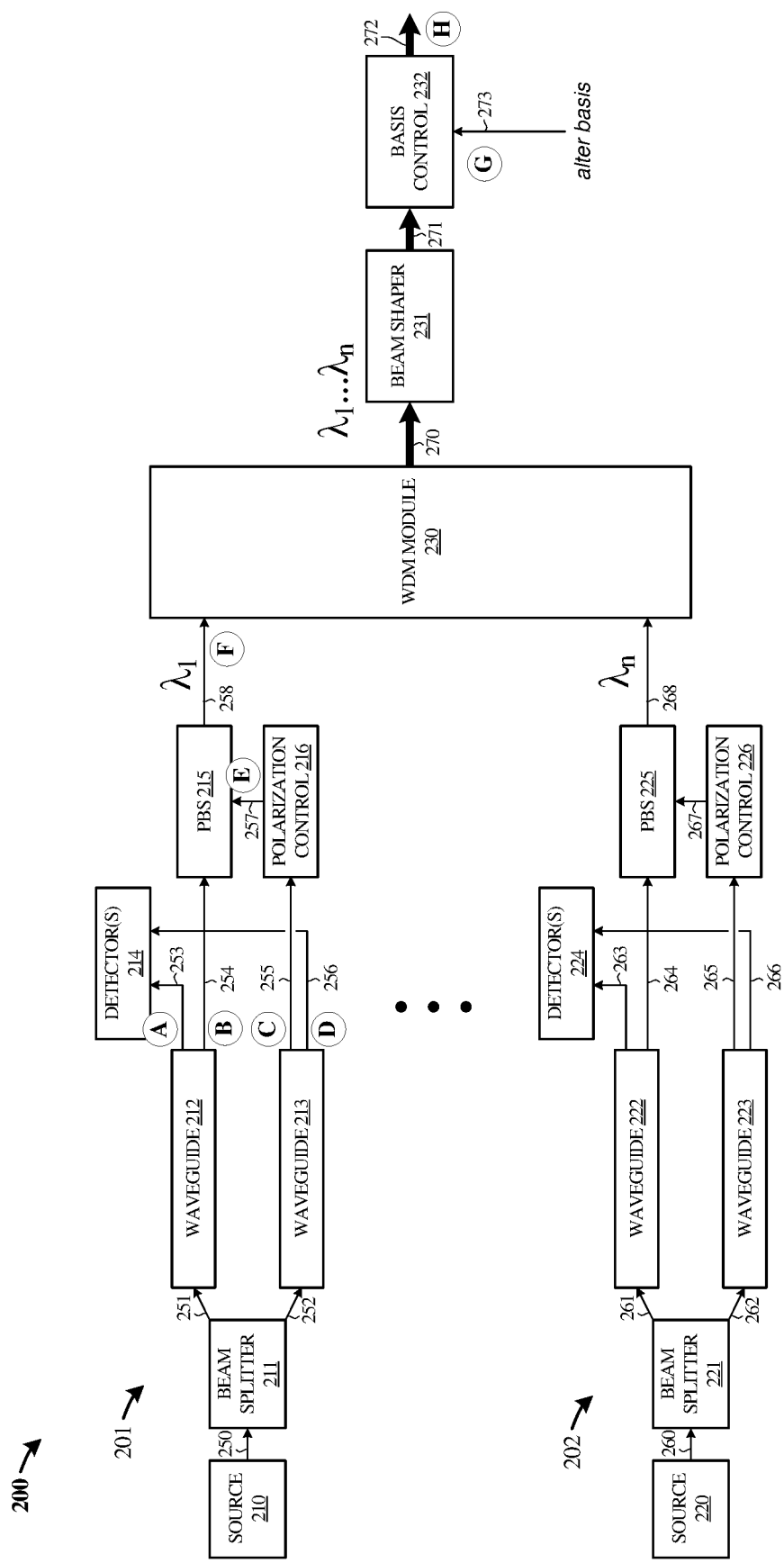
FIG. 2 illustrates elements forming a communication node in an implementation.

FIG. 2 includes configuration 200 illustrating elements forming a communication node in an implementation. The elements of configuration 200 might be employed in communication node 101 and 102 of FIG. 1, such as within random polarization state generation and detection element 113 and key exchange system 110. Configuration 200 includes a plurality of instances of photon stream generation modules, with two exemplary modules 201 and 202 shown in FIG. 2. Although the elements of module 201 are discussed herein, similar elements are included for module 202. Each module can correspond to a different photon wavelength among 'n' wavelengths (e.g., $\lambda 1, \lambda 2, \ldots \lambda n$), which are multiplexed into a common optical beam by wavelength division multiplexing module 230. However, it should be understood that a single module instance and wavelength can be employed.

Taking photon stream generation module 201 first, photon source 210 (and likewise photon source 220) comprises a single photon source. Photon source 210 might comprise a classical light source or non-classical light source. Photon source 210 can be continuous-wave (CW) or pulsed. However, photons generated by photon source 210 are ultimately converted into a non-classical arrangement by subsequent waveguides producing single photon pairs coming out into two separate paths. Examples of photon source 210 can include quantum dot-based single photon sources, heralded single photon sources, optical fiber-based single photon sources, laser-pumped single photon sources, atomic or molecular emission single photon sources, solid state or semiconductor single photon sources, or other photon sources that can produce a deterministic output of single photons in a non-Poisson distribution, which may include anti-bunching properties. The source photons, when taken in sequence and in total, can form a stream of single photon states emitted over link 250. Beam splitter 211 receives this photon stream and splits the stream into two evenly distributed streams, each over links 251-252 that feed a corresponding waveguide 212-213. In some examples, beam splitter 211 might be omitted and separate photon sources employed for each of waveguides 212-213.

Waveguides 212-213 (and likewise waveguides 222-223) each comprise a crystal structure having a selected length, diameter/width, and atomic doping. Dimensional properties of waveguide 212-213 are selected to produce a single-mode optical behavior, although multi-mode behavior might be employed in other examples. Waveguides can comprise specialized single-crystal waveguide structures as discrete structures or formed within integrated optical assemblies or fibers. Upon receipt of single photons from links 251-252, waveguides 212-213 each produce pairs of photons (as non-classical photon states) by downconverting each incoming photon into a pair of photons having double the wavelength and half the frequency. The timing of photon pair production is a classical or Poisson distribution, but the amplitude remains deterministic (i.e., single photons) within the pulse timing bins. Thus, a randomized timing is experienced for production of pairs of photons from each single incoming photon. The pairs of photons produced will have corresponding non-classical polarization states associated therewith, which are generally set based on the properties of the waveguide. Thus, at the output of each waveguide, pairs of photons are emitted each having a selected polarization property but with random timing. The resulting photon streams at the output of each waveguide comprise non-classical distributions of light with high probability of single photon states at a high average rate and a known temporal distribution. Also, since two concurrent waveguides are employed in each photon stream generation module of FIG. 2, the single photon rate is twice that of the individual waveguides. Although not required, the pathlengths of each waveguide can be matched. Various support elements for each waveguide can be included (not shown in FIG. 2 for clarity), such as heat removal elements, heat sinks, or other cooling elements. Heat can degrade the crystalline matrix of the waveguides, so a heat removal technique will often be employed.

Four photons are emitted per photon cycle from waveguides 212-213, with individual photons presented at links 253-256 and denoted by labels A, B, C, and D in FIG. 2. These labels are discussed in FIG. 3 for exemplary timing among photons. Links 254-255 provide first photons of the corresponding pairs from each of waveguides 212-213, while links 253 and 256 provide second photons of the corresponding pairs from each of waveguides 212-213. Detectors 214 measure or observe the second photons of the corresponding pairs provided over links 253 and 256. This measurement includes measuring a polarization state of the photons as well as timing associated with the photons. The timing can be calibrated such that it corresponds to a similar propagation pathlength for both waveguides and a comparison in timing can be made among second photons.

Detectors 214 (and likewise detectors 224) can comprise various types of single photon detectors, such as Geiger mode detectors. Individual Geiger mode detection elements can be arrayed into a one- or two-dimensional array of elements such that photons can be distributed in time over individual elements. This arrangement can provide for recovery times or dead times to be met for the individual detector elements after a photon is detected and triggers an avalanche response. Thin film micro-lens arrangements can provide for a multiplexing grid to distribute photons, and when many wavelengths/modules are employed, rows (or columns) can be designated for different time slots on a per-wavelength basis with columns (or rows) designated for each wavelength. Detectors 214 convert the detection event into an electrical signaling which can be provided to a control system over a corresponding digital link (not shown). A further example of detector arrangements is discussed in FIG. 7.

Polarizing beam splitter (PBS) 215 (and likewise PBS 225) acts as a combiner for two photon streams received over links 254 and 257. PBS 215 combines these two photon streams into a combined stream at link 258 which can be transferred to a remote node through beam shaper 231 and basis control 232, or combined with other combined streams of different wavelength by WDM module 230. PBS 215 can comprise a cube device, free-space device, or optical fiber device, among other configurations. However, before combination into the combined stream of link 258, the second photons of one of the waveguides is first passed through polarization control 216. Polarization control 216 (and likewise polarization control 226) comprises a static polarization control element to ensure orthogonality among outputs of waveguides 212-213 before input to PBS 215. This can ensure that two concurrent photon streams have mutual orthogonality and can be combined into a common stream/beam with minimal cross-stream interference. Link 258 thus includes two orthogonal photon streams with a combined photon rate double that of each individual waveguide/stream. For example, when each individual waveguide produces a 100 MHz photon rate, then link 258 will have a 200 MHz photon rate.

To further scale up the photon rate, multiple wavelengths of photons can be employed. As seen in FIG. 2, more than one combined stream of different wavelengths can be generated by modules 201 and 202, among other modules which can be included. Each module can correspond to a different photon wavelength among 'n' wavelengths (e.g., λ1, λ2, ... λn), which WDM module 230 multiplexes into a common optical beam at link 270. WDM module 230 can comprise various wavelength combiner elements, such as an optical prism. The quantity of wavelengths employed can depend on the application or the density of wavelengths supported by WDM module 230. Thus, a total photon rate established at link 270 might be several multiples of the single stream photon rate at link 258 or 268. This can reach into the GHz rates or higher. Moreover, the quantity of wavelengths might be selected based on a target bandwidth or target error rate of a photon beam transferred to a remote node, or to support data communications encrypted by secure shared keys established using such a photon beam. When an error rate for an individual photon beam or combined photon beam increases past a threshold level, the quantity of wavelengths can be increased to maintain a total error rate below a target. Likewise, a data communication bandwidth can dictate the quantity of wavelengths employed.

Beam shaper 231 receives a combined photon beam of many photon streams of many wavelengths from WDM module 230 over link 270 and formats, shapes, or otherwise conditions the photon beam for eventual transfer over a communication medium to a remote node. This conditioning can include reducing a cross-sectional diameter of the photon beam using various optic elements including lenses, mirrors, or deformable optical elements. However, before the photon beam is transferred over the communication medium, a final element is employed, namely basis control 232. Basis control 232 receives a conditioned photon beam over link 271.

Basis control 232 comprises a selectable polarization basis control element which can alter a basis state of the polarization of photons within the conditioned photon beam. Typically, the conditioned photon beam includes photons having polarizations within a selected unchanging basis set, such as rectilinear (linear) or circular. The polarizations of the conditioned photon beam remain polarized within the selected basis set, even if individual photons might be orthogonal to each other within such a basis set. Taking as an example the conditioned photon beam having a basis as rectilinear, then individual photons of conditioned photon beam can be randomly (in time) in the horizontal or vertical polarization states over link 271. Basis control 232 can be commanded to either leave unaltered or alter the basis of the conditioned photon beam. When altered, the basis changes the polarization basis of the beam into a different basis. Taking again the initial rectilinear basis, basis control 232 can selectively leave a photon beam in the rectilinear basis or alter into a circular basis. When basis switching is enabled (for an initial rectilinear basis), basis control 232 establishes individual photons of a resultant photon beam as right or left circular polarizations. Thus, horizontal linear polarizations can be changed into right circular polarizations and vertical linear polarizations can be changed into left circular polarizations. Other configurations are possible, including link 271 carrying circular polarization basis which is selectively converted to rectilinear basis, or using elliptical basis instead of circular or rectilinear.

Regardless of the initial basis of the source beam introduced into basis control 232, the rate of changing basis from unaltered to altered can be controlled via link 273. Link 273 can carry a binary selection signal determined by a control system or controller, although other signaling types can be employed. The rate of basis change is typically far less than that of the photon rate of the beam. This leads to a higher communication channel efficiency of the beam than other basis switching techniques. Some traditional basis switching techniques require basis switching with every photon, making the basis switching rate roughly equal to the photon rate, and requiring fast-switching polarization control elements. However, the example in FIG. 2 can use a lower basis switching rate, such as 1% of the photon rate when WDM techniques are employed. Equipment used to switch the basis can thus be less sophisticated or rapid to still support high bandwidths over a given communication channel. The rate of the basis changing can also be selectable to modify the beam properties for a particular error rate or eavesdropping rate and maintenance of a desired bandwidth. For example, if the quantity of photon states successfully identified by a remote node drops below a target quantity or rate, then the basis switching rate can be increased to consequently decrease an efficiency of the beam in exchange for higher photon detection integrity or detection energy. Likewise, if the quantity of photon states successfully identified by the remote node rises above a target quantity or rate, then the basis switching rate might be decreased to consequently increase an efficiency of the beam in exchange for lower photon detection integrity or detection energy.

Finally, once a beam having one or more wavelengths of photon streams is established at link 272, this beam can be emitted or otherwise transmitted for delivery to a remote node. Link 272 might include further optics or optical elements, such as pointing/aiming elements, gimbal elements, further focusing or collimating optics, deformable optics, and the like. Link 272 can comprise a free-space optical link or may be carried by optical waveguide or fiber. Likewise, links 250-258, 260-268, 270-271 can each comprise optical waveguides, optical fibers, free space elements, or omitted entirely when adjacent elements/components/modules are optically coupled directly without intervening pathways. This direct coupling might be encountered when an integrated optical chip or integrated optical device is employed.

Figure 3:
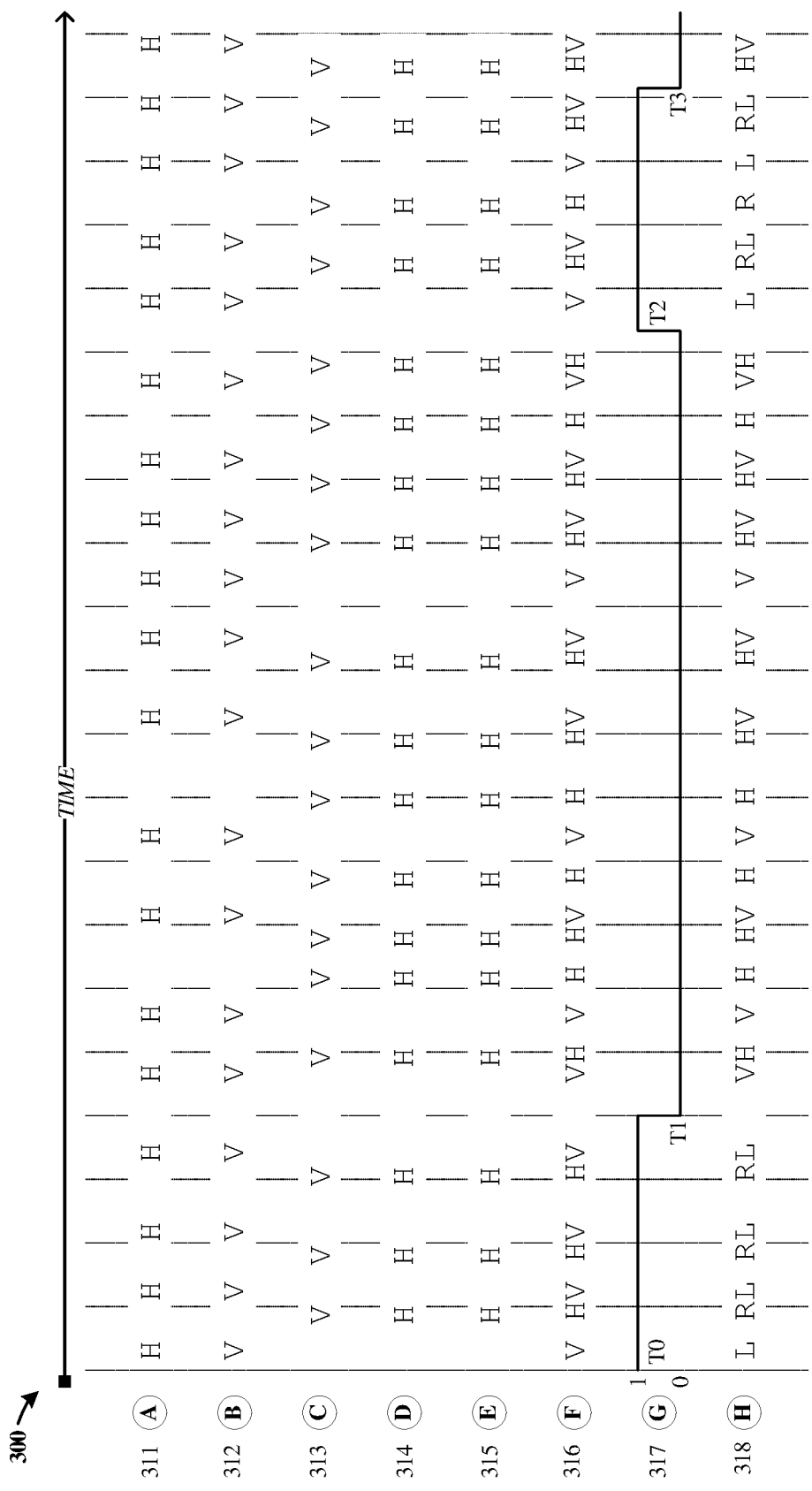
FIG. 3 illustrates example photon polarization states for a communication node in an implementation.

Turning now to an operational timing discussion of the elements of FIG. 2, FIG. 3 is presented. FIG. 3 comprises timing diagram 300 that includes several traces or rows 311-318 corresponding to nodes within configuration 200 of FIG. 2. Specifically, labels A, B, C, D, E, F, G, and H correspond to nodes found in FIG. 2 and rows shown in FIG. 3. A horizontal axis relates to an increasing time, with vertical lines denoting equal segments of time among the rows.

Rows 311-312 correspond to nodes A and B in FIG. 2 and an output of waveguide 212 at links 253-254. Photon pairs are generated based on single photons introduced into waveguide 212, and each photon of the photon pair is represented in row 311 and 312, respectively. As can be seen, a rectilinear basis is used for these photons, and are generated as having mutually opposite or orthogonal polarizations according to conservation symmetries. One of the photons of the pair, a 'first' photon, is provided at node A for detection/measurement. A 'second' photon of the pair is provided at node B for eventual propagation to a remote node. While the polarizations of the first/second photons of the pair are predetermined due in part to the chosen physical properties of the waveguide, the timing of the generation of the pair of photons is a random physical process. Thus, the instant in time that corresponds to the pair generation (and propagation to nodes A and B) will vary photon pair-to-photon pair in a random manner, even if the initial photons introduced into waveguide 212 have consistent timing.

Rows 313-314 correspond to nodes C and D in FIG. 2 and an output of waveguide 213 at links 255-256. Photon pairs are generated based on single photons introduced into waveguide 213, and each photon of the photon pair is represented in row 313 and 314, respectively. As can be seen, a rectilinear basis is used for these photons, and are generated as having mutually opposite or orthogonal polarizations according to conservation symmetries. One of the photons of the pair, a 'first' photon, is provided at node D for detection/measurement. A 'second' photon of the pair is provided at node C for eventual propagation to a remote node. While the polarizations of the first/second photons of the pair are predetermined due in part to the chosen physical properties of the waveguide, the timing of the generation of the pair of photons is a random physical process. Thus, the instant in time that corresponds to the pair generation (and propagation to nodes C and D) will vary photon pair-to-photon pair in a random manner, even if the initial photon introduced into waveguide 213 has a consistent timing. Moreover, the timing of photon pairs at nodes A and B will vary randomly from the timing of photon pairs at nodes C and D.

Row 315 corresponds to node E in FIG. 2 and an output of polarization control element 216. As noted above, polarization control element 216 has a static or fixed polarization changing property such that photons introduced to element 216 have an opposite or orthogonal polarization upon exit from element 216. Thus, row 315 shows node E as having an opposite or orthogonal polarization (within the same basis) as node C. The timing of node E is slightly delayed from that of node C, due to photon propagation delays, even if not evident from FIG. 3.

Row 316 corresponds to node F in FIG. 2, and an output of PBS 215, comprising combined photon streams of two individual and mutually orthogonal photon streams originated from each waveguide 212-213. As can be seen for row 316, a randomized stream of photons and polarization states is exhibited, and the timing between the polarization states and photons themselves is random in nature. Measurement of photons streams at nodes A and D provides for local determination of these polarization states and associated timing.

Thus, through node F of FIG. 2, an initial basis is employed, which in this example comprises rectilinear basis. Other examples might employ a different initial basis. From here, WDM module 230 and beam shaper 231 do not significantly impact the inter-photon timing or polarization states. However, basis control 232 can alter the basis of the many photon streams that establish an output beam (which might include many individual photon streams of different wavelengths). Basis control 232 is controlled via link 273 and an example control signal is shown for row 317 in FIG. 3, which corresponds to node G in FIG. 2. During a first time period, from at least T0-T1, a first basis control state is established at link 273, namely a binary '1' shown in row 317. In this example, a basis control state of '1' indicates that basis of the incoming photon streams at basis control 232 should be altered into a different basis. This can be seen for node H in FIG. 2 and row 318 that the rectilinear basis of row 316 has been change to circular basis, which corresponds to H/V (horizontal/vertical) polarizations being altered into R/L (right/left) circular polarizations. Then, at time T1, basis control changes to a '0' state which corresponds to an unaltered or unchanged pass-through basis for the photon streams from links 271 to 272. This can be seen in row 318 as the polarization returns to H/V. At times T2 and T3 further changes to the basis can be seen in row 317 and corresponding polarization states of row 318.

This changing of basis for the photon streams before emission to a remote node can assist with error detection/correction due to passive observations or intentional eavesdropping of the emitted photon beam. The slow switching rate of basis as compared to the photon rate is referred to herein as time binning of basis states, where several photons are binned together at the same basis for a period of time. Advantageously, basis for the output beam at node H can be switched at a rate slower than the photon production rate, and provide error and eavesdropping checks while maintaining a high bandwidth of communications. Also, it should be noted that when many different wavelengths of photons are combined by WDM module 230, then basis control 232 might affect basis of all of the various photon streams of various wavelengths in a similar manner. However, other examples may switch basis differently in time or in selected basis for different wavelengths to provide operational advantages when certain wavelengths might experience higher error rates or eavesdropping potential.

Figure 4:
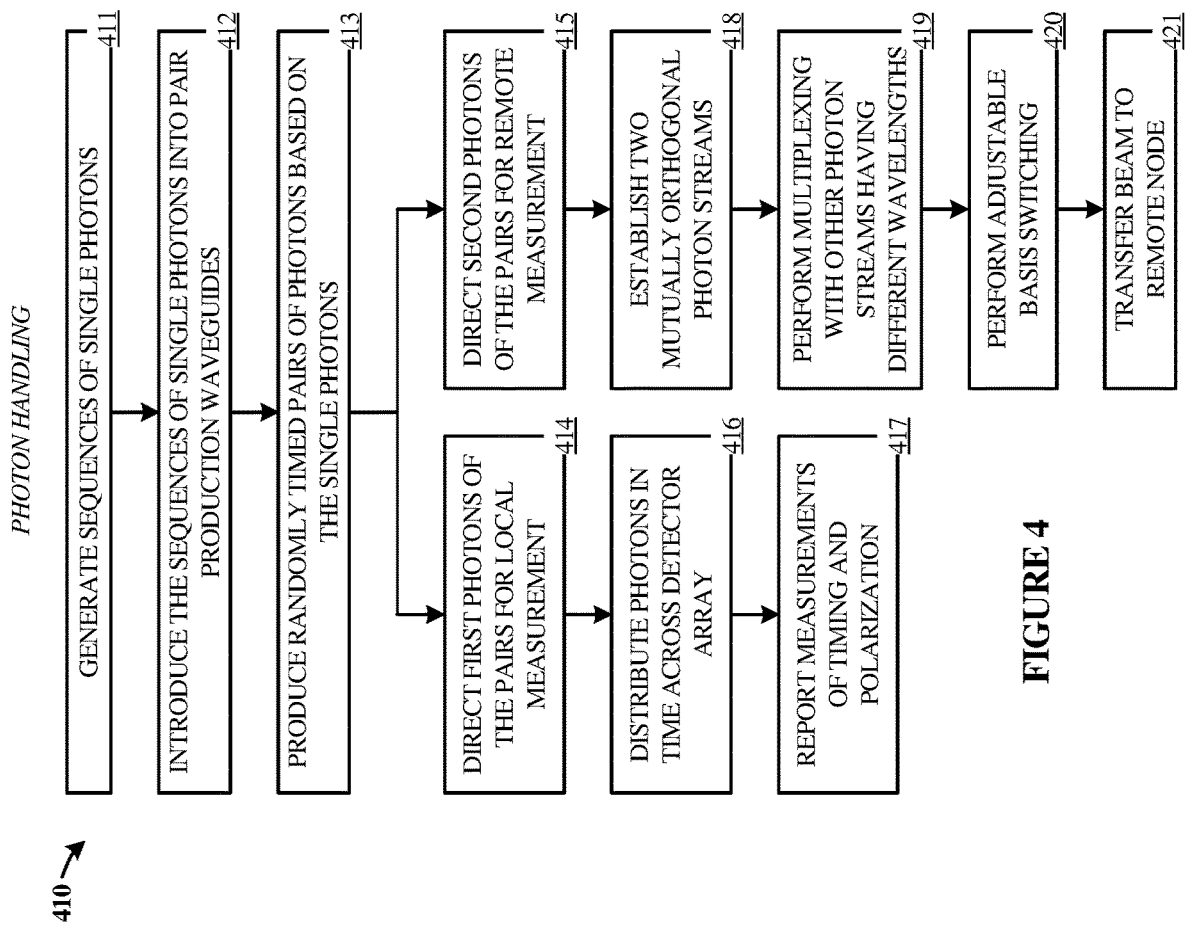
FIG. 4 illustrates example photon handling operations for a communication node in an implementation.

FIG. 4 illustrates example photon handling and polarization state generation operations 410 for any of the systems described herein. Although the operations of FIG. 4 are discussed in the context of FIG. 2, it should be understood that the operations can apply to similar elements found in FIG. 1 or FIG. 8.

Source 210 generates (411) sequences of single photons over link 250, and beam splitter 211 introduces (412) the sequences of the single photons into pair production waveguides 212-213 over links 251-252. Waveguides 212-213 each produce (413) randomly timed pairs of resultant photons based on the single photons introduced over links 251-252. Waveguides 212-213 each direct (414) first resultant photons of the pairs for local measurement over links 253 and 256 to detectors 214. Waveguides 212-213 each direct (415) second resultant photons of the pairs for remote measurement over links 254-255. Each set of second resultant photons can be referred to as a photon stream. For the locally-measured resultant photons, detectors 214 distribute (416) the resultant photons in time across a detector array to compensate for recovery times of individual detector elements. Detectors then convert the measurements of the resultant photons into electrical signals or digital indications and report (417) the measurements of timing and polarization to a secure key determination system (such as key generator and storage element 115 of FIG. 1).

While second resultant photons of the pairs for waveguide 212 are provided to PBS 215 over link 254, second resultant photons of the pairs for waveguide 213 are provided first to polarization control 216. Polarization control 216 establishes (418) two mutually orthogonal photon streams by establishing orthogonal polarization states for the photons received over link 255 and then provides these orthogonal photons over link 257 to PBS 215. PBS 215 then forms a combined photon stream comprising the photon stream from waveguide 212 and the photon stream (made orthogonal) from waveguide 213. The combined photon stream can then be combined with other combined photon streams, such as that produced by PBS 225 for another wavelength. WDM module 230 performs (419) multiplexing with these other combined photon streams having different wavelengths to form a beam at link 270. This beam can be modified by beam shaper 231 to have better propagation properties, such as beam width, collimation, or other properties. Basis control module 232 receives the beam over link 271 and selectively performs (420) adjustable basis switching. The basis switching is controlled by link 273, which indicates a pass-through mode (no basis switching) or a basis switched mode. Finally, basis control module 232 can transfer (421) the beam to a remote node, with any associated beam aiming/pointing or other optics included before emission to the remote node.

Figure 5:
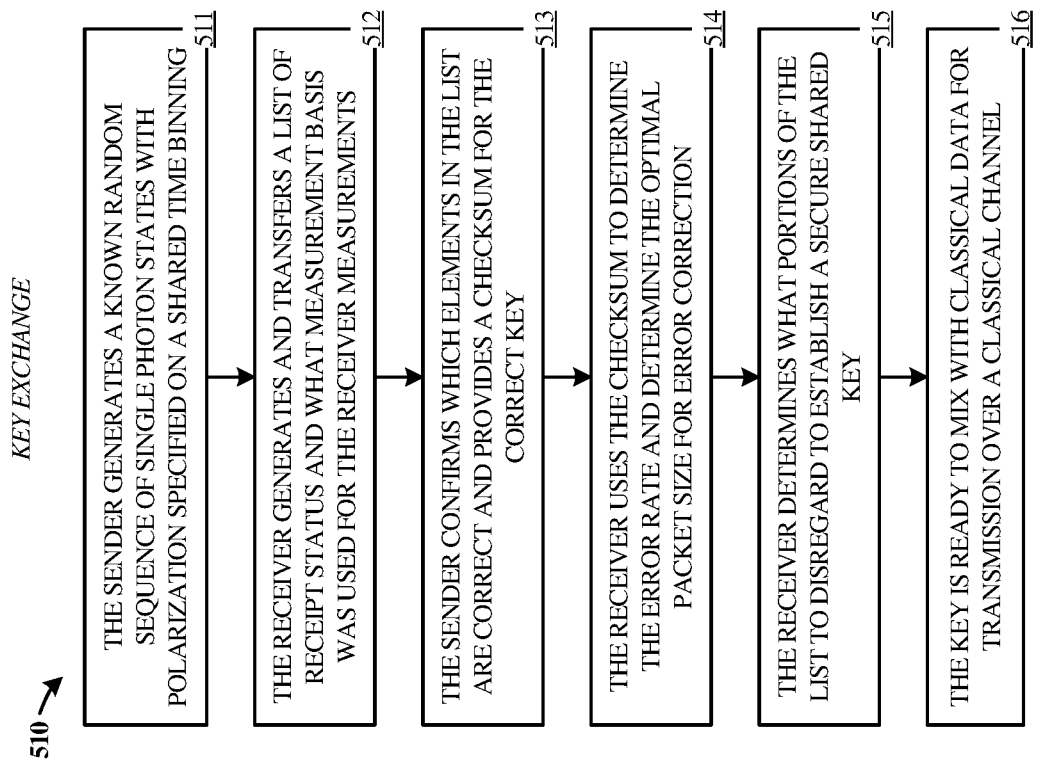
FIG. 5 illustrates example key exchange operations for a communication node in an implementation.

Thus, FIG. 4 describes transfer of random sequences of photons having corresponding polarization states for delivery to a remote node. Local measurement ensures that timing and polarization states are known to the local sender node. Remote measurement by the remote node can then be used in combination with the local measurements to determine a shared security key. FIG. 5 describes this process, and uses the baseline of the beam of photons as a starting point.

FIG. 5 illustrates example key exchange operations 510 for any of the systems described herein. Although the operations of FIG. 5 are discussed in the context of FIG. 1, it should be understood that the operations can apply to similar elements found in FIG. 2 or FIG. 8. For purposes of discussion in FIG. 5, the term "sender" refers to communication node 101, and the term "receiver" refers to communication 102.

A sender generates (511) a known random sequence of single photon states with polarization specified on a shared time binning. This process is described in FIG. 4, where beam comprising a sequence of photon states having random timing between at least two mutually orthogonal photon streams is established. Basis is controlled for the entire beam at a rate much slower than the photon rate. As discussed herein, the basis change rate can be adjusted to adjust for error rates, among other channel conditions. When multiple wavelengths of photons are employed in a WDM arrangement, then the photon rate is increased proportional to the quantity of wavelengths. This can lead to much larger secure shared keys or much faster key determination for a given key size (in bits). For example, to establish a key, the sender might require a certain quantity of photon states to be transferred to the receiver. This may take a certain amount of time for a single wavelength of photons, but the length of time can be decreased significantly when the quantity of wavelengths is increased. Alternatively, for a given window of time, a larger number of photon states can be transferred using multiple wavelengths, and this can lead to a larger and more secure key, or can compensate for large error rates or eavesdropping conditions.

The receiver generates (512) and transfers data indicating a list or record of receipt status and what measurement basis was used at the receiver. Within the receiver, an optical detection system can detect at least a portion of the single photon states transferred by the sender. The single photon states might not all be detected, or may be detected incorrectly at the receiver. Nonetheless, the receiver makes measurements of the beam and compiles a list of each potential photon state, in terms of polarization, timing, and basis used for such measurements (by the receiver). This list or record can then be transferred to the sender over classical channels, such as RF communication links, optical links, or other links denoted by link 152 in FIG. 1. These links need not be secured or encrypted.

Responsive to receiving the list from the receiver, the sender confirms (513) which elements in the list are correct and provides a checksum against the correct key. The correct key comprises the local measurement of photon states by the sender, which is compiled and stored to be later compared against the measurements made by the receiver, including basis properties for the measurements. At this point, the sender has determined the secure shared key at the sender. To also determine the secure shared key at the receiver, the sender transfers the checksum over link 151 for delivery to the receiver. The receiver uses (514) the checksum to determine the secure shared key. Elements of the sender and the receiver, such as a channel error handler module, can also determine an error rate and determine the optimal packet size for error correction for communications. The checksum is compared against the list of the receiver that was transferred in operation 512 to determine which photon states were measured correctly and under which basis. From this comparison, the receiver can determine the secure shared key. Also, the receiver can determine which measurements were in error which indicates an error rate for the channel over which the photon states were transferred. This error rate can be employed to determine a packet size when transferring encrypted data between the sender and receiver to optimize communication channel efficiency or at least increase an efficiency of the communication channel based on the present conditions, which may comprise natural error conditions or eavesdropping conditions. Thus, a classical error correction protocol is used (515) at both the sender and receiver to determine what portions of the list to disregard or discard to establish the secure shared key. Further examples of the error rate and protocol selection is discussed in FIG. 6.

Once the secure shared key is determined at both the sender and receiver, the secure shared key is ready to mix (516) with classical data for transmission over a classical communication channel. For example, the sender might encrypt data using the secure shared key and transfer the encrypted data over classical link 151 for delivery to the receiver which then uses the secure shared key to decrypt the data. Likewise, the receiver might instead encrypt data using the secure shared key and transfer the encrypted data over classical link 152 for delivery to the sender which then uses the secure shared key to decrypt the data. In this manner, a secure shared key is established over a non-classical communication channel (e.g., link 150) and communications encrypted using the secure shared key can be exchanged over a classical channel (e.g., links 151-152).

In many examples, the secure shared key, once determined, is stored in a buffer at the sender and receiver to be used once and then discarded. Many secure shared keys can be securely and continuously generated to encrypt data over time. With a sufficient rate, the secure shared key might never need to be reused, resulting in secure communications over classical channels. The non-classical link for key generation only relies on a quantum channel transmitting in one direction, such as link 150. However, the classical channel must support two-way communications to generate a corrected key (e.g., links 151 and 152). The secure shared keys can then be used to transmit data securely over the classical channel in either direction. Communication protocol for how to employ the secure shared key can be selected or adjusted on the expected ratio of transmission directions. The secure shared keys can be generated continuously using the non-classical channel while secure communications are being exchanged over the classical channel. Two-way classical channel communication using error correction results in a corrected secure shared key with a generation rate set by quantum channel error rates, quantum channel rates, classical channel rates, and classical channel error rates. Typically, it is the quantum channel rate and error rate that set the secure shared key rate. Further examples can include state preparation for combining quantum codes and state superposition across communication channels and leveraging the classical channel.

Figure 6:
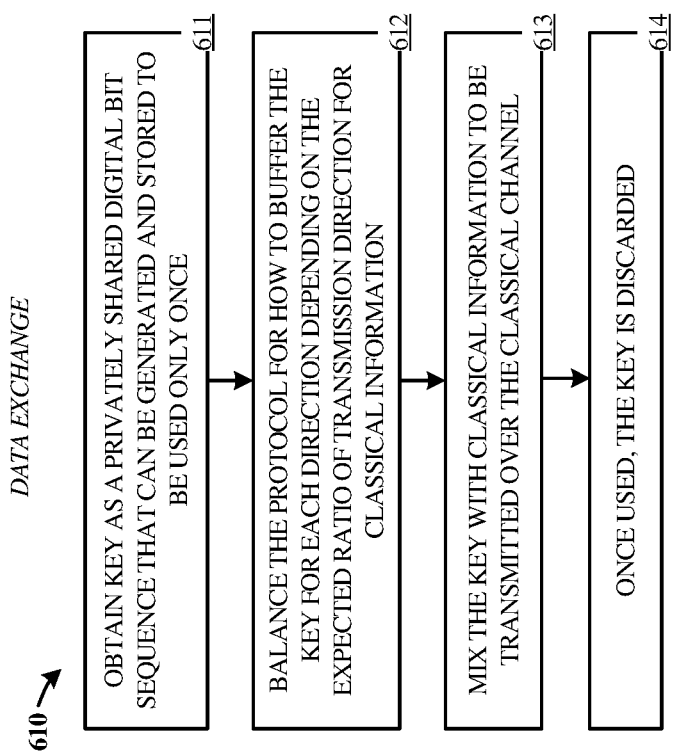
FIG. 6 illustrates example data exchange operations for a communication node in an implementation.

FIG. 6 illustrates example data exchange operations 610 for any of the systems described herein. Although the operations of FIG. 6 are discussed in the context of FIG. 1, it should be understood that the operations can apply to similar elements found in FIG. 2 or FIG. 8. For purposes of discussion in FIG. 6, the term "sender" refers to communication node 101, and the term "receiver" refers to communication 102.

The sender and receiver obtain (611) a secured shared key or many keys as a privately shared digital bit sequence that can be generated and stored to be used only for one encrypted data transfer, although some examples may use the secure shared key more than once. FIGS. 4 and 5 above discuss further example operations of secure shared key determination between the sender and receiver. The sender and receiver can store the secure shared keys in a buffer, such as key storage elements 111 and 131, and can establish a ratio of secure shared keys stored/used at the sender or the receiver as a balancing protocol (612) for how to buffer the key for each direction. This ratio can depend on the expected or desired ratio of transmissions in a particular direction over the classical channels, such as a ratio of sender-transferred data versus receiver-transferred data.

Once secure shared keys are established at the sender and receiver, a transmitting node will mix (613) the secure shared keys with information or data to be transmitted over the classical channels, such as over one of links 151-152. This mixing, also referred to as encoding or encrypting, will render the data secured for transfer over potentially unsecure channels. Also, to achieve maximum security, each secure shared key is discarded (614) after one use, although variations are possible for lesser security.

Figure 7:
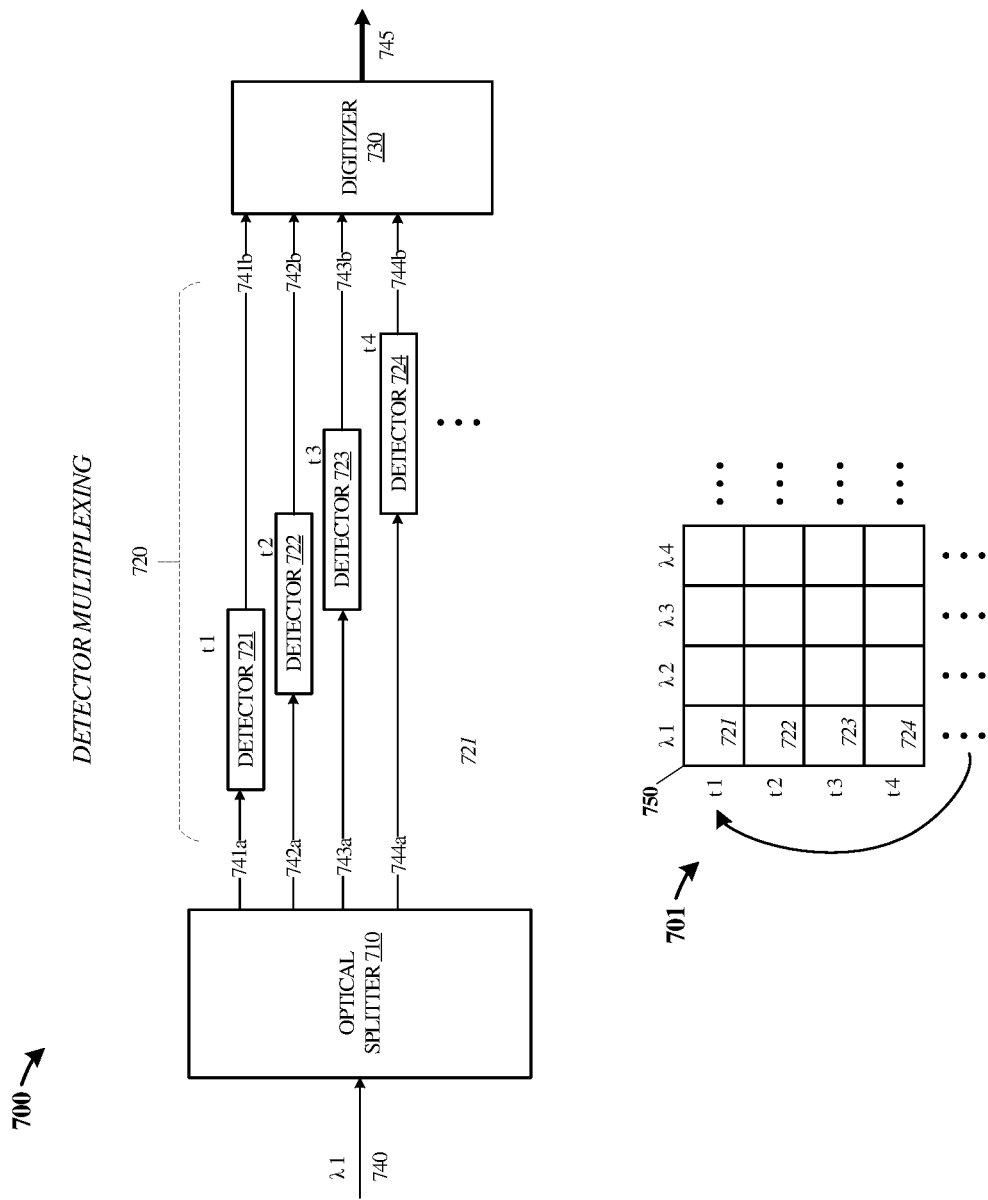
FIG. 7 illustrates example optical detector multiplexing in an implementation.

Turning now to FIG. 7, example detector multiplexing techniques with system 700 is presented. System 700 includes optical splitter 710, detectors 721-724, and digitizer 730. FIG. 7 also includes detector array configuration 701 showing a two-dimensional arrangement of detector elements. System 700 shows an example detector arrangement for a particular photon wavelength. When many wavelengths are employed, such as in wavelength division multiplexing schemes, then individual instances of system 700 can be employed for each wavelength.

Turning first to system 700, optical splitter 710 receives sequences of single photons over link 740. These photons can be generated using a pair-producing waveguide arrangement noted herein, and the photons can be transferred over an optical link comprising 740. Optical splitter 710 comprises optic elements configured to distribute incoming photons over individually selected optical links 741a-744a. This distribution occurs in time, such that photons are distributed to optical links 741a-744a to provide for detectors 721-724 to recover from prior photon detections. While a sequential ordering or sequencing among optical links 741a-744a can be achieved in some examples, a randomized or quasi-random distribution can also be employed as long as detector recovery times are met. Once photons are distributed among optical links 741a-744a, individual detectors among detectors 721-724 can detect the photons and produce a detection signal on corresponding links 741b-744b. Links 741b-744b can comprise electrical links which carry analog indications of detections or carry varying analog signals which can be later interpreted as a detection event. Regardless of the output format on links 741b-744b, digitizer 730 converts the analog indications on links 741b-744b into digital representations for transfer over digital link 745. Digitizer can comprise an analog-to-digital (A/D) converter circuit or device, and can sample links 741b-744b according to a desired detection rate and provide a digital representation in a serial or parallel manner over link 745 for delivery to a control system (not shown) which is used to determine shared secret keys. This control system might comprise elements of FIG. 1 including element 113 of communication node 101.

System 700 can achieve a high rate of photon detection for relatively slower single photon detectors, such as Geiger mode detector elements which require a recovery time or dead time after an avalanche event from an incoming photon. This effectively scales the detector bandwidth to meet any photon rate produced in a communication node. System 700 detects incident photons and properties thereof, such as polarization states or timing among individual photons. The timing can be established by characterizing link lengths and pathlengths to zero-out relative differences in pathlengths for each detector pathway. Precision and stable clocking of digitizer 730 can also be employed to ensure proper detection of timing of photons, but the level of precision can be reduced based on the level of characterization and stability of the pathlengths. Thus, system 700 separates individual photons of a photon stream for routing to different detector elements, which then detect the photons. Digitizer 730 acts to recombine the photon stream into a digital representation having correct relative timing among photons.

The time multiplexing or time-wise distribution of photons to different detectors can prevent saturation of the detector elements and give sufficient recovery time from detection events. For one example arrangement of Geiger mode detector elements, a 20 MHz detection rate might be sustainable per detector element. Thus, for a 200 MHz photon rate (100 MHz per waveguide in FIG. 1), and the 20 MHz detection rate per detector element, 10 detector elements per wavelength can be employed. A 500 MHz digitizer rate might be employed for such detection rates. At this 500 MHz digitization rate, various sampling factors, such as the Nyquist rate, can be satisfied for a 200 MHz photon rate. The quantity of channels of digitizer 730 can scale to the quantity of detectors per wavelength, and multiple wavelengths might be digitized by a single digitizer if the inputs can support such sample sizes.

Turning now to detector array configuration 701, a two-dimensional arrangement of detector elements is shown. Although the exact configuration of rows and columns can vary, the example in FIG. 7 shows rows as corresponding to different instances of time and columns corresponding to different wavelengths in a multiple-wavelength system. In examples that only employ one wavelength, a single column might be employed or a two-dimensional array can be employed to handle many more instances of time. However, the quantity detector elements per wavelength (i.e., number of rows) will depend in part on the photon rate and the detector detection rate or recovery rate. Thus, the detectors can be looped or iterated again for detection after the recovery period has expired for each detector.

To distribute photons in time and in wavelength over a two-dimensional array of detectors, various techniques and elements can be employed. These elements comprise optical splitter 710, and can include thin film photon micro-lens distribution/multiplexing grids, among other optic elements.

Advantageously, the examples herein provide for an effective and efficient non-classical secure key exchange system, techniques, and protocols. Traditional non-classical key exchange systems have photon rates tied directly to speeds of active polarization switching control of individual photons in both basis and polarization within that basis. In our examples, no switched polarization control is used at the photon rate. Instead, specialized waveguides generate photon pairs with Poisson-distributed timing, and these randomized-in-time photons establish a randomized polarization for streams of photons. Basis can be switched but at a much lower rate than the photon rate, preventing limits on the photon rate based on active switching devices. Basis switching rates are also adjustable based on channel conditions, error rates, and eavesdropping events. Photon rates can be scaled by adding further wavelengths of photons in similar waveguide-based arrangements. While more detector elements are needed to determine local photon properties and timing, these detector elements can be integrated into compact arrays and multiplexed in time to achieve high densities of detector elements. Therefore, very high photon rates and corresponding rates of secure key determination are achieved to support high bandwidth communications through a variety of channel conditions.

Figure 8:
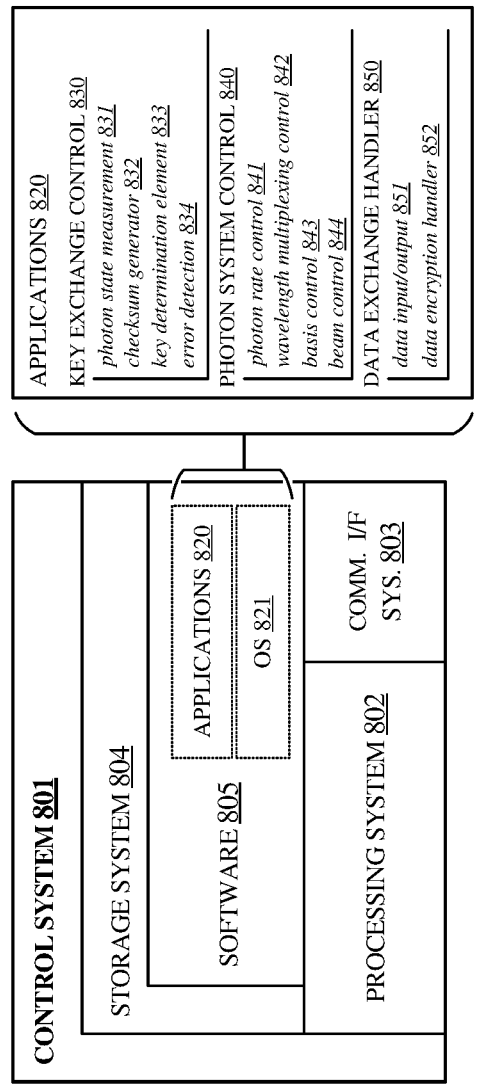
FIG. 8 illustrates a control system for a communication node in an implementation.

FIG. 8 illustrates control system 800 and associated software 805 in an implementation. Control system 800 is representative of any system or collection of systems in which various control, command, or processing of operational techniques, algorithms, architectures, scenarios, and processes disclosed herein may be implemented. For example, control system 800 can be used to implement portions of control elements or processing elements of FIG. 1, such as portions of communication nodes 101 or 102. Similarly, control system 800 can implement control, command, or processing elements for configuration 200. Control system 800 can implement control, command, or processing for one or more portions of the operations found in FIGS. 4 and 5. It should be understood that while executable software elements are described for control system 800, various portions can instead be implemented in circuitry, such as application-specific circuitry, programmable logic devices, discrete circuitry, and other arrangements.

Control system 800 may be implemented as a single apparatus, system, or device or may be implemented in a distributed manner as multiple apparatuses, systems, or devices. Control system 800 includes, but is not limited to, processing system 802, communication interface system 803, storage system 804, and software 805. Processing system 802 is operatively coupled with communication interface system 803 and storage system 804.

Processing system 802 loads and executes software 805 from storage system 804. Software 805 includes applications 820, at least some of which are representative of the operational techniques, algorithms, architectures, scenarios, and processes discussed with respect to the included Figures. When executed by processing system 802 to perform a secure key exchange process, establish a secure shared key, encrypt and exchange data using the secure shared key, and control various elements that form the aforementioned components, among other services, software 805 directs processing system 802 to operate as described herein for at least the various processes, operational scenarios, and sequences discussed in the foregoing implementations. Control system 800 may optionally include additional devices, features, or functionality not discussed for purposes of brevity.

Processing system 802 may comprise a microprocessor and processing circuitry that retrieves and executes software 805 from storage system 804. Processing system 802 may be implemented within a single processing device but may also be distributed across multiple processing devices or subsystems that cooperate in executing program instructions. Examples of processing system 802 include general purpose central processing units, application specific processors, programmable logic units, graphics processing units, and logic devices, as well as any other type of processing device and supporting circuitry, combinations, or variations thereof.

Storage system 804 may comprise any tangible computer readable storage media readable by processing system 802 and capable of storing software 805. Storage system 804 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. A computer readable storage media, as discussed herein, does not refer to a propagated signal. In addition to computer readable storage media, in some implementations storage system 804 may also include computer readable communication media over which at least some of software 805 may be communicated internally or externally. Storage system 804 may be implemented as a single storage device but may also be implemented across multiple storage devices or sub-systems co-located or distributed relative to each other. Storage system 804 may comprise additional elements, such as a controller, capable of communicating with processing system 802 or possibly other systems.

Software 805 may be implemented in program instructions and among other functions may, when executed by processing system 802, direct processing system 802 to operate as described with respect to the various operational scenarios, sequences, and processes illustrated herein. For example, software 805 may include program instructions comprising applications 820 and operating system 821 to perform a secure key exchange process, establish a secure shared key, encrypt and exchange data using the secure shared key, and control various elements that form the aforementioned components, among other services. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software or other application software, in addition to or that include applications 820. Software 805 may also comprise firmware or some other form of machine-readable processing instructions executable by processing system 802.

Software 805, when loaded into processing system 802 and executed, may transform a suitable apparatus, system, or device (of which control system 800 is representative) overall from a general-purpose computing system into a special-purpose computing system customized to perform a secure key exchange process, establish a secure shared key, encrypt and exchange data using the secure shared key, and control various elements that form the aforementioned components, among other services. Indeed, encoding software 805 on storage system 804 may transform the physical structure of storage system 804. The specific transformation of the physical structure may depend on various factors in different implementations of this description. Examples of such factors may include, but are not limited to, the technology used to implement the storage media of storage system 804 and whether the computer-storage media are characterized as primary or secondary storage, as well as other factors. For example, if the computer-readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 820 can include key exchange control 830, photon system control 840, and data exchange handler 850. Key exchange control 830 includes photon state measurement 831, checksum generator 832, key determination element 833, error detection 834. Photon system control 840 includes photon rate control 841, wavelength multiplexing control 842, basis control 843, and beam control 844. Data exchange handler 850 includes data input/output 851 and data encryption handler 852.

Turning first to key exchange control 830, photon state measurement 831 handles control of detection elements configured to detect individual photons. Photon state measurement 831 can control digitization elements, sampling rates, detector status and failure monitoring, and can receive digital representations of the detection events, among other operations. Checksum generator 832 receives records or lists transferred by remote nodes that indicate measured/detected photon properties, compares local measurements to the remote measurements indicated in the lists, and produces difference checksums indicating which remote measurements were correct. The checksum can be transferred over data exchange handler 850 for delivery to the remote node. Key determination element 833 determines the secure shared key, such as based on the checksum information, among other factors including basis, timing, or polarization states of locally/remotely measured photons. Key determination element 833 can provide secure shared keys into storage for use by data exchange handler 850. Error detection 834 can determine rates of errors in detection at the remote node and channel conditions to determine eavesdropping or changes in error rates which can be applied to alter basis switching rates, density of wavelength division multiplexing, or other transmission changes.

Turning next to photon system control 840, photon rate control 841 can adjust the photon rate as generated by photon sources, or adjust a quantity of active photon sources to achieve a target photon rate. When WDM techniques are employed, photon rate control 841 communicate with wavelength multiplexing control 842 to control a quantity of active wavelengths to achieve target photon rates, which might be adjustable based on non-classical or classical channel conditions. Basis control 843 can adjust a rate of basis switching as well as determine current basis states to apply to photon beams. The basis switching rate can vary based on channel conditions, error rates, or other factors discussed herein, and basis control 843 can monitor these factors and make adjustments accordingly.

Beam control 844 provides control of the various optical devices and optic elements, which may include controlling orientation, pointing, tilt, motor elements, gyroscopic elements, lens/mirror elements, light sensing elements, pointing assistance elements, or other elements associated with beam shapers or optical emission and collection devices. Beam control 844 can include telemetry or ephemeris elements that provide capture and storage of present states of various elements of an optical system, such as environmental or ambient conditions (temperature, humidity, vibrational states), optic pointing status, optic operational health status, beam operational status, satellite or vehicle positioning, orbital status, or other telemetry.

Finally, data exchange handler 850 includes data input/output 851 which can receive digital data from external systems, network interfaces, or local storage for transfer to a remote node, and receive unencrypted data transferred by a remote node over a classical channel. Data input/output 851 can also receive unencrypted data provided by data encryption handler 852 after decoding or decrypting data secured with the secure shared key. Data input/output 851 can also packetize or frame data as-needed and enact various handshaking, communication protocols, retransfers, header/footer processing, and other various data and communication functions for classical channels. Data input/output 851 can provide data interfaces, such as APIs, sockets, network stacks, and other similar elements. Data encryption handler 852 can communicate with key storage elements to obtain secure shared keys and encrypt/encode data for transfer to a remote node. Data encryption handler 852 can decrypt data using secure shared keys for local storage, routing, or further transfer to associated data.

Communication interface system 803 may include communication elements and circuitry that allow for communication with various elements under the control of control system 800, external systems, computing systems, or electrical components over communication links or communication networks. Communication interface system 803 may provide interface portions of key exchange control 830, photon system control 840, or data exchange handler 850, such as physical link layer portions or other communication layer elements. Communication interface system 803 may communicate over various communication mediums to exchange communications with other computing systems or networks of systems, such as conductors, waveguides, air, free space, or any other suitable communication mediums. Physical or logical elements of communication interface system 803 can receive input from users or other operators.

Communication between control system 800 and other elements or systems over communication interface system 803 may occur using data links, control links, communication links, or communication networks and in accordance with various communication protocols, combinations of protocols, or variations thereof. For example, control system 800 when implementing a control device, might communicate with external circuitry or optical/photon handling elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, example network topologies include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet Protocol (IP), the transmission control protocol (TCP), and the user datagram protocol (UDP), as well as any other suitable communication protocol, variation, or combination thereof. Communication interface system 803 may include circuitry to handle the aforementioned interfacing and links, such as transmitters/receivers, transceivers, network interface controllers, antennas, power amplifiers, RF circuitry, digital interfaces, optoelectronic circuitry, and other communication circuitry.

Communication interface system 803 may include a software or virtual interface such as a terminal interface, command line interface, or application programming interface (API). Communication interface system 803 may also include physical user interfaces, such as keyboard, a mouse, a voice input device, or a touchscreen input device for receiving input from a user. Communication interface system 803 may include visualization/status interfaces, user command controls, and telemetry, such as user controls, start/stop controls, operating mode control interfaces, visualization interfaces, and system characteristic calibration controls, among others. Output devices such as displays, speakers, web interfaces, terminal interfaces, and other types of output devices may also be included in communication interface system 803. In network interface examples, communication interface system 803 might packetize data for receipt by a display system or computing system coupled over one or more network interfaces. Communication interface system 803 may comprise API elements for interfacing with users, other data systems, other user devices, web interfaces, and the like. Communication interface system 803 may also include associated user interface software executable by processing system 802 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and arrangements discussed herein are employed according to the descriptions above. However, it should be understood that the disclosures and enhancements herein are not limited to these materials and arrangements, and can be applicable across a range of suitable materials and arrangements. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:
    introducing, by at least one photon source, source photons into corresponding waveguides configured to convert the source photons into randomly timed pairs of resultant photons having corresponding polarization states and non-deterministic pair-to-pair timings;
    in a first node, for first photons of each of the pairs, producing first measurements of the corresponding polarization states and timing properties;
    providing second photons of each of the pairs presented in orthogonal polarizations for combination into a beam for transfer to a second node distant from the first node;
    processing a record provided by the second node against the first measurements to determine a checksum indicating which portions of the record were correctly measured by the second node, wherein the record indicates second measurements of polarization states and timing properties of detected second photons of the beam and an indication of a measurement basis used at the second node for the second measurements;
    determining a cryptographic key based at least on the checksum and the record; and
    establishing communication exchange with the second node based on the cryptographic key.

2. The method of claim 1, wherein providing the first photons of each of the pairs for measurement of the corresponding polarization states comprises providing the first photons to detectors configured to measure the timing properties and the corresponding polarization states, and provide indications of the timing properties and the corresponding polarization states to an encryption system that determines the cryptographic key based in part on the timing properties and the corresponding polarization states in combination with measurements of the beam made by the second node.

3. The method of claim 2, wherein the detectors comprise arrays of Geiger-mode detector elements, with the arrays fed by an optical splitter element that receives the first photons and distributes in time the first photons to individual Geiger-mode detector elements among the arrays to account for recovery times of the individual Geiger-mode detector elements.

4. The method of claim 1, wherein the beam is employed to transfer the second photons carrying polarization states to the second node which responsively generates a record of detected polarization states and measurement basis used for the detected polarization states.

5. The method of claim 4, comprising:
    receiving the record from the second node;
    transferring the checksum for delivery to the second node;
    wherein the second node processes the checksum and the detected polarization states to determine the cryptographic key, and transfers communications encrypted using the cryptographic key.

6. The method of claim 1, comprising:
    switching a basis state of the beam with a rate lower than a photon rate of the beam to establish a shared time binning for polarization states of the photons of the beam, wherein changes to the basis state are employed to detect observations made of the beam while in transit to the second node.

7. The method of claim 6, wherein the basis state of the beam is switched after combination of the second photons into the beam.

8. The method of claim 1, comprising:
    by multiple photon sources, generating the source photons at different wavelengths and introducing the source photons into corresponding wavelength-segregated sets of waveguides to convert the source photons into wavelength-segregated sets of the randomly timed pairs of the resultant photons; and
    performing wavelength division multiplexing to combine beams associated with each of the wavelength-segregated sets into a multiplexed beam carrying more than one concurrent wavelength of photons and associated polarization states for delivery to the second node.

9. An apparatus, comprising:
    at least one photon source configured to introduce source photons into corresponding waveguides of a first node configured to convert the source photons into randomly timed pairs of resultant photons having corresponding polarization states and non-deterministic pair-to-pair timings;
    the waveguides configured to provide first photons of each of the pairs to detectors that measure the corresponding polarization states and timing properties, and provide second photons of each of the pairs presented in orthogonal polarizations for delivery to a beam combiner;
    the beam combiner configured to establish a combination of the second photons into a beam for transfer to a second node distant from the first node;

a key exchange system configured to:
  process a record provided by the second node against the first measurements to determine a checksum indicating which portions of the record were correctly measured by the second node, wherein the record indicates second measurements of polarization states and timing properties of detected second photons of the beam and an indication of a measurement basis used at the second node for the second measurements;
  determine a cryptographic key based at least on the checksum and the record; and
  establish communication exchange with the second node based on the cryptographic key.

10. The apparatus of claim 9, comprising:
the waveguides configured to provide the first photons to detectors configured to measure the timing properties and the corresponding polarization states, and provide indications of the timing properties in and the corresponding polarization states to an encryption system that determines the cryptographic key based in part on the timing properties and the corresponding polarization states in combination with measurements of the beam made by the second node.

11. The apparatus of claim 10, wherein the detectors comprise arrays of Geiger-mode detector elements, with the arrays fed by an optical splitter element that receives the first photons and distributes in time the first photons to individual Geiger-mode detector elements among the arrays to account for recovery times of the individual Geiger-mode detector elements.

12. The apparatus of claim 9, wherein the beam is employed to transfer polarization states to the second node which responsively generates a record of detected polarization states and measurement basis used for the detected polarization states.

13. The apparatus of claim 12, comprising:
a communication interface configured to receive the record from the second node;
key exchange system configured to transfer the checksum for delivery to the second node;
wherein the second node processes the checksum and the detected polarization states to determine the cryptographic key, and transfers communications encrypted using the cryptographic key.

14. The apparatus of claim 9, comprising:
a control system configured to switch a basis state of the beam with a rate lower than a photon rate of the beam to establish a shared time binning for polarization states of the photons of the beam, wherein changes to the basis state are employed to detect observations made of the beam while in transit to the second node.

15. The apparatus of claim 14, wherein the basis state of the beam is switched after the beam combiner.

16. The apparatus of claim 9, comprising:
multiple photon sources each configured to generate the source photons at different wavelengths and introduce the source photons into corresponding wavelength-segregated sets of waveguides to convert the source photons into wavelength-segregated sets of the randomly timed pairs of the resultant photons; and
a wavelength division multiplexer configured to combine beams formed from second photons associated with each of the wavelength-segregated sets into a multiplexed beam carrying more than one concurrent wavelength of photons and associated polarization states for delivery to the second node.

17. A system, comprising:
a sender node configured to generate an optical beam by combination of randomly timed streams of single photon states and transfer the optical beam for delivery to a receiver node, wherein a basis of the optical beam is specified on a shared time binning;
the receiver node configured to generate a record by at least detecting timing properties and polarization states of the single photon states and a measurement basis used for the detected photon states, and transfer the record for delivery to the sender node;
the sender node configured to process the record against at least independent local measurements of polarization states and timing properties of the single photon states to determine a checksum indicating which portions of the record were correctly measured by the receiver node, and transfer the checksum for delivery to the receiver node; and
the receiver node configured to process the checksum and the record to determine a secure shared key, wherein communications are exchanged between the sender node and the receiver node based on the secure shared key.

18. The system of claim 17, comprising:
the sender node configured to switch the basis of the optical beam to establish the shared time binning with a rate lower than a photon rate of the optical beam, wherein changes to the basis are employed to detect observations made of the optical beam while in transit to the receiver node.

19. The system of claim 17, comprising:
the sender node configured to generate the optical beam by at least:
  introduce, by at least one photon source, source photons into corresponding waveguides configured to convert the source photons into randomly timed pairs of resultant photons having corresponding polarization states and non-deterministic pair-to-pair timings;
  providing first photons of each of the pairs for the local measurements; and
  providing second photons of each of the pairs for combination into the optical beam, wherein the second photons from one of the waveguides are presented in an orthogonal polarization before combination.

20. The system of claim 19, comprising:
the sender node configured to:
by multiple photon sources, generate the source photons at different wavelengths and introduce the source photons into corresponding wavelength-segregated sets of waveguides to convert the source photons into wavelength-segregated sets of the randomly timed pairs of the resultant photons; and
perform wavelength division multiplexing to combine beams associated with each of the wavelength-segregated sets into the optical beam carrying more than one concurrent wavelength of photons and associated polarization states for delivery to the remote node.

* * * * *